(12) United States Patent
Hill et al.

(10) Patent No.: US 7,562,899 B2
(45) Date of Patent: Jul. 21, 2009

(54) COATING FOR AN INFLATABLE VEHICLE OCCUPANT PROTECTION DEVICE

(75) Inventors: Bruce R. Hill, Bloomfield Hills, MI (US); David A. Grilli, Troy, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 11/180,771

(22) Filed: Jul. 13, 2005

(65) Prior Publication Data

US 2007/0015425 A1 Jan. 18, 2007

(51) Int. Cl.
*B60R 21/16* (2006.01)

(52) U.S. Cl. .................... 280/728.1; 428/34.1; 442/181

(58) Field of Classification Search ................ 428/34.1; 280/728.1; 442/76
See application file for complete search history.

(56) References Cited

U.S. PATENT DOCUMENTS

| | | | |
|---|---|---|---|
| 3,028,355 A | 4/1962 | Toy et al. | |
| 4,612,221 A | 9/1986 | Biel et al. | |
| 6,451,715 B2 | 9/2002 | Li et al. | |
| 6,455,449 B1 | 9/2002 | Veiga et al. | |
| 6,458,724 B1 * | 10/2002 | Veiga et al. | .................... 442/76 |
| 6,607,797 B1 | 8/2003 | Ritter | |
| 6,630,220 B1 * | 10/2003 | Veiga | .......................... 428/102 |
| 6,698,458 B1 * | 3/2004 | Sollars et al. | ............... 139/389 |
| 6,713,131 B2 | 3/2004 | Blackwood et al. | |
| 6,770,578 B2 * | 8/2004 | Veiga | .......................... 442/164 |
| 2002/0022420 A1 | 2/2002 | Veiga et al. | |
| 2002/0145276 A1 | 10/2002 | Veiga | |
| 2008/0169631 A1 * | 7/2008 | Hill | .......................... 280/743.1 |

FOREIGN PATENT DOCUMENTS

WO 2005/035323 4/2005

* cited by examiner

*Primary Examiner*—Arti Singh-Pandey
(74) *Attorney, Agent, or Firm*—Tarolli, Sundheim, Covell & Tummino LLP

(57) ABSTRACT

An inflatable vehicle occupant protection device (10) includes a fabric substrate (12) and a coating (14) provided on a surface (16) of the fabric substrate (12). The coating (14) includes a thermoplastic polyether polyurethane base resin and an antiblocking agent. The base resin is at least about 50% by weight of the coating (14).

8 Claims, 4 Drawing Sheets

US 7,562,899 B2

COATING FOR AN INFLATABLE VEHICLE OCCUPANT PROTECTION DEVICE

FIELD OF THE INVENTION

The present invention relates to an inflatable vehicle occupant protection device for helping to protect an occupant of a vehicle.

BACKGROUND OF THE INVENTION

An inflatable vehicle occupant protection device may have a variety of constructions. For example, the inflatable vehicle occupant protection device may be constructed of overlying woven panels. The overlying woven panels can be interconnected by means, such as stitching or ultrasonic welding, to form connections or seams that help define an inflatable volume of the protection device. The inflatable vehicle occupant protection device can also have a one piece woven construction in which overlying panels are woven simultaneously. The panels form connections or seams that help define an inflatable volume of the one piece woven protection device.

The inflatable vehicle occupant protection device may be sealed to help control the gas permeability of the protection device. This may be done to maintain pressurization of the inflatable vehicle occupant protection device for a desired duration. A sealant may be applied to the inflatable vehicle occupant protection device via knife coating, extrusion coating, or lamination.

SUMMARY OF THE INVENTION

The present invention relates to an inflatable vehicle occupant protection comprising a fabric substrate and a coating provided on a surface of the fabric substrate. The coating includes a thermoplastic polyether polyurethane base resin and an antiblocking agent. The base resin comprises at least about 50% by weight of the coating.

The coating can be provided in a single layer on the fabric substrate so that the coating has an outer surface that defines the outer surface of the inflatable vehicle occupant protection device. The coating can also be applied to the fabric substrate at an add-on weight less than about 35 g/m$^2$.

In an aspect of the invention, the coating can comprise about 60% to about 85% by weight of a thermoplastic polyether polyurethane base resin, about 10% to about 20% by weight of a halogen-free flame retardant, and about 1% to about 10% by weight of an antiblocking agent.

In another aspect of the invention, the coating can comprise about 60% to about 85% by weight of a polytetramethylene glycol ether polyurethane and about 1% to about 10% by weight of an antiblocking agent. The coating can further include about 10% to about 20% by weight of a halogen-free flame retardant.

In a further aspect of the invention, the coating can be applied to the inflatable vehicle occupant protection device by laminating a film of the coating onto an outer surface of the inflatable vehicle occupant protection device. Alternatively, the coating can be provided on the inflatable vehicle occupant protection device by knife coating a solution of the coating on the inflatable vehicle occupant protection device and drying the solution.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

The present invention relates to a coating of an inflatable vehicle occupant protection device. The coating can reduce the gas permeability of the inflatable vehicle occupant protection device so that upon inflation the inflatable vehicle occupant protection device is substantially gas impermeable. The coating is also resistant to blocking and can improve the puncture resistance of the inflatable vehicle occupant protection device.

Figure 1:
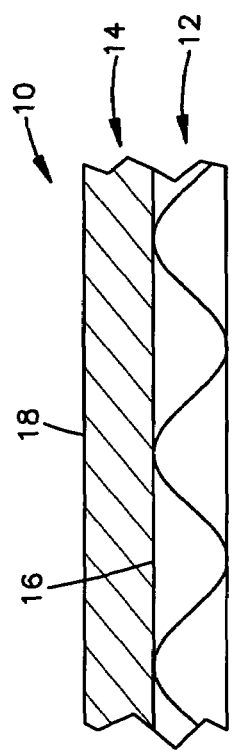
FIG. 1 is a schematic cross-sectional view of a portion of a vehicle occupant protection device in accordance with an aspect of the present invention.

FIG. 1 is a schematic cross-sectional illustration of a portion of an inflatable vehicle occupant protection device 10 in accordance with an aspect of the invention. The inflatable vehicle occupant protection device 10 comprises a fabric substrate 12 and a coating 14. The coating 14 substantially covers an outer surface 16 of the fabric substrate 12 and defines an outer surface 18 of the inflatable vehicle occupant protection device 10.

The fabric substrate 12 can comprise natural fibers, such as cotton, and/or synthetic fibers, such as polyamide fibers (e.g., nylon 6/6) and polyester fibers. The fibers can be in the form of a knit, woven, or non-woven fabric. For example, nylon fiber can be woven to form the fabric substrate 12. The fabric substrate 12 can have any denier size, shape, and weaving configuration. The denier size, shape, and weaving configuration used for the fabric substrate 12 can depend on the location of the inflatable vehicle occupant protection device 10 in the vehicle. For example, an inflatable side curtain can be substantially rectangular or oval in configuration and comprise a one piece woven fabric of 350 dtex nylon 6/6 yarn in a construction of 235×235 ends/dm/layer.

The coating 14 covering the outer surface 16 of the fabric substrate 12 is formed from a thermoplastic material that comprises a thermoplastic polyether-based polyurethane (i.e., a polyether polyurethane) base resin and an intimately mixed antiblocking agent. A polyether polyurethane is employed as the base resin in the coating because it is hydrolytically stable in contrast to polyester polyurethanes, exhibits low temperature flexibility and impact resistance, exhibits low gas and vapor permeability, is readily processed with conventional extrusion and thermoplastic molding techniques, and is relatively inexpensive compared to other hydrolytically stable thermoplastic polyurethanes.

Polyether polyurethane also exhibits minimal degradation due to oxidation and is resistant to delamination from a fabric substrate at elevated temperatures. For example, woven bags were coated with a polyether polyurethane and subjected to aging conditions of 105° C. for 270 hours and inflated at an elevated temperature. At a temperature of about 85° C., the polyether polyurethane remained adhered to the fabric substrate at pressures up to about 100 kPa. A similar non-aged polyether polyurethane remained adhered to the fabric substrate at pressures up to about 130 kPa. At about 65° C., after aging, the polyether polyurethane remained adhered to the fabric substrate up to 125 kPa compared with 145 kPa before aging. In contrast, polyester polyurethanes and polycaprolactone polyurethanes had lower adhesion to fabric substrates under similar conditions.

An example of a thermoplastic polyether polyurethane that can be used in accordance with the present invention is commercially available from Dow Chemical Company (Midland, Mich.), under the tradename PELLETHANE 2103-90AE. The exact details of the chemical composition of PELLETHANE 2103-90AE are not known. It is known, however, that PELLETHANE 2103-90AE is a thermoplastic polyurethane elastomer based on a polytetramethylene glycol ether. PELLETHANE 2103-90AE has a hardness of about 90A and about 47D (both measured in accordance with ASTM D 2240), a specific gravity of 1.14 (ASTM D 792), a tensile modulus at 50% elongation of 6.3 Mpa (ASTM D 412), an ultimate tensile strength of 38.2 MPa (ASTM D 412), an ultimate elongation of 530% (ASTM D 412), an elongation set after break of 60% (ASTM D 412), a tear strength of 133 Die "C" KN/m (ASTM D 624), a Vicat softening temperature of about 90.6° C., a coefficient of linear thermal expansion of about 155 mm/mm/° C.$\times 10^{-6}$ (ASTM D 696), a glass transition temperature of $-34°$ C. (Differential scanning calorimetry (DSC)), a flexural modulus of 65.9 MPa (ASTM D 790), a molding melt temperature of about 193° C. to about 210° C., and an extrusion temperature of about 188° C. to about 204° C.

Another example of a thermoplastic polyether polyurethane that can be used in accordance with the present invention is commercially available from Dow Chemical Company (Midland, Mich.), under the tradename PELLETHANE 2103-85AE. The exact details of the chemical composition of PELLETHANE 2103-85AE are not known. It is known, however, that PELLETHANE 2103-85AE is a thermoplastic polyurethane elastomer based on a polytetramethylene glycol ether. PELLETHANE 2103-85AE has a hardness of about 88A and about 48D (both measured in accordance with ASTM D 2240), a specific gravity of 1.14 (ASTM D 792), a tensile modulus at 50% elongation of 5.5 Mpa (ASTM D 412), an ultimate tensile strength of 32 MPa (ASTM D 412), an ultimate elongation of 560% (ASTM D 412), an elongation set after break of 80% (ASTM D 412), a tear strength of 82.3 Die "C" KN/m (ASTM D 624), a Vicat softening temperature of about 67.2° C., a coefficient of linear thermal expansion of about 169 mm/mm/° C.$\times 10^{-6}$ (ASTM D 696), a glass transition temperature of $-38°$ C. (Differential scanning calorimetry (DSC)), a molding melt temperature of about 188° C. to about 204° C., and an extrusion temperature of about 182° C. to about 199° C.

The base resin can also comprise a mixture of polyether polyurethanes. For example, the base resin can comprise a mixture of a first polytetramethylene glycol ether, such as PELLETHANE 2103-90AE, and a second polytetramethylene glycol ether, such as PELLETHANE 2103-85AE. The amount of each respective polyether polyurethane provided in the mixture can be varied to vary the properties (e.g., hardness, softening temperature, tensile modulus, and melt temperature) of the coating.

The amount of base resin provided in the coating 14 is at least about 50% by weight of the coating 14. By way of example, the amount of base resin provided in the coating 14 can be about 60% to about 85% by weight of coating. Optionally, the amount of base resin provided in the coating 14 can be about 75% to about 80% by weight.

The antiblocking agent in accordance with the present invention can comprise any antiblocking agent that is effective to reduce the coefficient of friction of the coating 14 (e.g., from about 0.83 to about 0.58 (ISO 8295)) without substantially increasing the add-on weight in g/m$^2$ of the coating 14 provided on the fabric substrate 12. Reducing the coefficient of friction of the coating 14 can mitigate blocking or sticking of adjacent coated surfaces of the inflatable vehicle occupant protection device 10 when, for example, the inflatable vehicle occupant protection device 10 is folded for storage.

An example of one such antiblocking agent comprises a mixture of a polyurethane and a diatomaceous earth product (e.g., diatomaceous silica). The polyurethane used for the antiblocking agent can comprise a polyester polyurethane and/or a polyether polyurethane. Examples of diatomaceous earth products can include finely divided diatomaceous earth fluxed with sodium carbonate (e.g., SUPERFLOSS, Johns-Manville Company, Denver, Colo.). The weight ratio of the polyurethane to the diatomaceous earth can be from about 60 parts polyurethane to about 40 parts diatomaceous earth to about 40 parts polyurethane to about 60 parts diatomaceous earth.

Other examples of antiblocking agents that can be used in accordance with the present invention can include calcium carbonate, carbon nanotubes and fibers, graphite, ceramic and glass microspheres, synthetic silicas, synthetic clay (e.g., laponite), talc, zeolites, organic microparticles, and flurocomponds. It will be appreciated that other antiblocking agents can be used as long as these other antiblocking agents are effective to mitigate blocking of adjacent coated surfaces of the inflatable vehicle occupant protection device 10.

The amount of antiblocking agent provided in the coating is about 1% to about 10% by weight of the coating. At amounts less than about 1% by weight of the coating, an insufficient amount of antiblocking agent is provided to mitigate effectively blocking of adjacent coated surfaces of the inflatable vehicle occupant protection device 10. At amounts greater than about 10% by weight, the antiblocking agent can increase the add-on weight of the coating and adversely affect the processing (e.g., extrusion) of the base resin as well as potentially degrade the adhesion of the coating 14 to the fabric substrate 12. In an aspect of the invention, the antiblocking agent can be provided in the coating 14 in an amount of about 2.5% to about 7.5% by weight of the coating 14 (e.g., about 5% by weight of the coating).

Optionally, the coating 14 can include a flame retardant that is effective to mitigate or reduce the susceptibility of the coating 14 to ignition and combustion upon exposure to a high-temperature environment, a spark, or an open flame. In accordance with an aspect of the invention, the flame retardant is a non-halogenated (i.e., halogen-free) flame retardant. A halogen-free flame retardant in contrast to a halogenated flame retardant, such as bromine, does not degrade adhesion of the coating and does exacerbate oxidative and/or hydrolytic breakdown of the polyether polyurethane base resin.

An example of a halogen-free flame retardant is resorcinol bis(diphenyl phosphate) (RDP). RDP is commercially available as a clear liquid from Great Lakes Polymer Additives, West Lafayette, Ind. under the tradename REOFOS RDP. Other halogen-free flame retardants can also be used in the coating.

The amount of halogen-free flame retardant provided in the coating 14 can be that amount effective to mitigate or reduce the susceptibility of the coating 14 to ignition and combustion upon exposure to a high-temperature environment, a spark, or a flame. By way of example, this amount can be from about 10% by weight to about 20% by weight of the coating 14. In another example, the amount of halogen-free flame retardant provided in the coating 14 can be about 15% by weight of the coating.

The coating 14 in accordance with the present invention can also include a secondary resin that is intimately mixed or combined with the base resin. The secondary resin can include any resin, such as a silicone or siloxane based resin, that can be combined with the base resin to adjust the mechanical properties (e.g., hardness, glass transition temperature, melting temperature, and/or tensile modulus) of the base resin.

The secondary resin can be provided in the coating 14 at an amount effective to adjust the mechanical properties of the coating 14. This amount can vary, but will typically be from about 5% to about 20% by weight of the coating 14.

One example of a secondary resin that can be used in accordance with the present invention is DOW CORNING MB50-010 MASTERBATCH, which is commercially available from Dow-Corning, Midland, Mich. DOW CORNING MB50-010 MASTERBATCH is an ultra-high molecular weight (UHMW) siloxane polymer dispersed in HYTREL (E.I. du Pont de Nemours & Co., Wilmington, Del.). DOW CORNING MB50-010 MASTERBATCH when incorporated into the coating 14 at amounts of about 5% to about 15% by weight of the coating can reduce the glass temperature of the coating 14 and mitigate potential low-temperature cracking of the coating 14.

Another example a secondary resin that can be used in accordance with the present invention is METABLEN SX, which is commercially available from Mitsubishi Rayon, JP. METABLEN SX is a silicone-acrylic based rubber. METABLEN SX when incorporated into the coating 14 at amounts of about 10% to about 20% by weight of the coating 14 can increase the impact strength, improve weatherability, and reduce the glass temperature of the coating 14.

The coating 14 in accordance with the present invention can further include an oxidation inhibitor. The oxidation inhibitor can be present in the coating 14 in a stabilizing effective amount. Such amount can be, for example, about 0.1% to about 1.0%, by weight of the coating 14.

Oxidation inhibitors, which can be employed in the coating of the present invention, include any antioxidant commonly employed in polyurethane based compositions. The oxidation inhibitor can be capable of providing antioxidant protection at processing temperatures of about 175° C. to about 250° C. or higher.

Examples of such oxidation inhibitors can include primary or hindered phenolic stabilizers, such as p-hydroxyphenylcyclohexane, di-p-hydroxphenylcyclohexane dicresylolpropane, tertiary butyl para cresol; 2,6-di-tert-butyl-p-cresol, 2,4,6-tri-tert-butylphenol; octadecyl-3-(3',5'-di-tert-butyl-4'-hydroxyphenol)propionate, tetra kis[methylene 3-(3',5'-tert-butyl-4'-hydroxyphenyl)propionate]methane, 1,3,5-trimethyl-2,4,6-tris(3,5-di-tert-butyl-4-hydroxybenzyl)benzene, tris(3,5-di-tert-butyl-4-hydroxybenzyl)isocyanate, 1,3,5-tris(4-tert-butyl-3-hydroxy-2,6 dimethyl benzyl)-1,3,5-triazine-2,4,6-(1H,3H,5H)-trione, and bis-[3,3-bis-4'-hydroxy-3'-tert-butyl-phenyl)-butanoic acid]-glycol ester, condensation products of dialkylphenols with formaldehyde, reaction products of phenol with styrene, 1,1'-methylene-bis(4-hydroxy-3,5-tert-butyl-phenol), 2,2'-methylene-bis-(4-methyl-6-tert-butylphenol), 2,6-(2-tert-butyl-4-methyl-6-methylphenol)-p-cresol, phenylethylpyrocatechol, phenolisoproplpyrocatechol, 1,1,3-tris(2'-methyl-3'-t-butyl-4-hydroxy phenol) butane, 2,2-methylene-bis[6-(O)-methyl-cyclohexyl)-4-methylphenol], 1,3,5-trimethyl-2,4,6-tris-(3',5'-di-t-butyl-4-hydroxybenzyl)benzene and 2-napthol, sulfur containing compounds such as 2,2'-thio-bis-(4-methyl-6-tert-butylphenol), 4,4-thio-bis(3-methyl-6-tert-butylphenyl), distearyl thiodipropionate, dilauryl thiodipropionate, phosphite compounds, such as trimixed mono and dinonyl phenyl phosphites, phosphite esters of lauryl and stearyl alcohol, di-stearyl-pentaerythritoldiphosphite; bis(2,4-di-tert-butyl-phenyl) pentaerythritol diphosphite, tri-2,4-di-tert-butyl phenyl phosphite ester, 2,6-ditertiary-butyl-paracresol or butylated hydroxy toluene (BHT), octadecyl-3-(3,5-di-tert-butyl-4-hydroxy phenyl) propionate (IRGANOX); tetra-kis[methylene 3-(3',5'-di-tert-butyl-4'-hydroxyphenyl) propionate]methane (IRGANOX 1010), 2,2' ethylidene bis (4,6-di-tert-butylphenol) (ISONOX 129); or 1,3,5-tris(4-tert-butyl-3-hydroxy-2,6-dimethyl benzyl)-1,3,5-triazine-2,4,6-(1H,3H,5H)-trione (CYANOX 1790). The hindered phenolic oxidation inhibitors may be used individually or in various combinations with one another in the coating 14 of the present invention.

Optionally, the coating 14 can include other additives typically used in polyurethane coatings. Examples of these other additives can include pigments (e.g., ultramarine blue and/or cobalt blue), inorganic fillers, and stabilizers. The other additives can be provided in the coating 14 in amounts up to about 1% by weight of the coating 14.

The coating 14 can be applied to the fabric substrate 12 at an add-on weight of less than about 35 g/m$^2$ (e.g., about 28 g/m$^2$ to about 32 g/m$^2$) so that the air permeability of the fabric substrate 12 is substantially reduced (e.g., substantially gas impermeable) and the puncture resistance of the fabric substrate 12 is substantially increased. The coating 14 applied to the fabric substrate 12 can have a substantially uniform thickness of about 25 microns to about 125 microns. In an aspect of the invention, the coating 12 can have a substantially uniform thickness of about 25 microns to about 75 microns.

In a method of the present invention, the coating 12 can be applied to the outer surface 16 by initially compounding the components of the coating 14 to form, for example, a plurality of pellets. The pellets can be dissolved in a solvent, such as a polar aprotic solvent (e.g., dimethyl formamide (DMF)), to form a viscous solution (e.g., 30% solids with a viscosity of about 15,000 cps), coated on the fabric substrate, and then heated to drive-off the solvent. Alternatively, the pellets can blown extruded to form a thin film (e.g., about 25 microns to about 75 microns). The thin film can then be laminated on the outer surface 16 of the fabric substrate 12.

Figure 2:
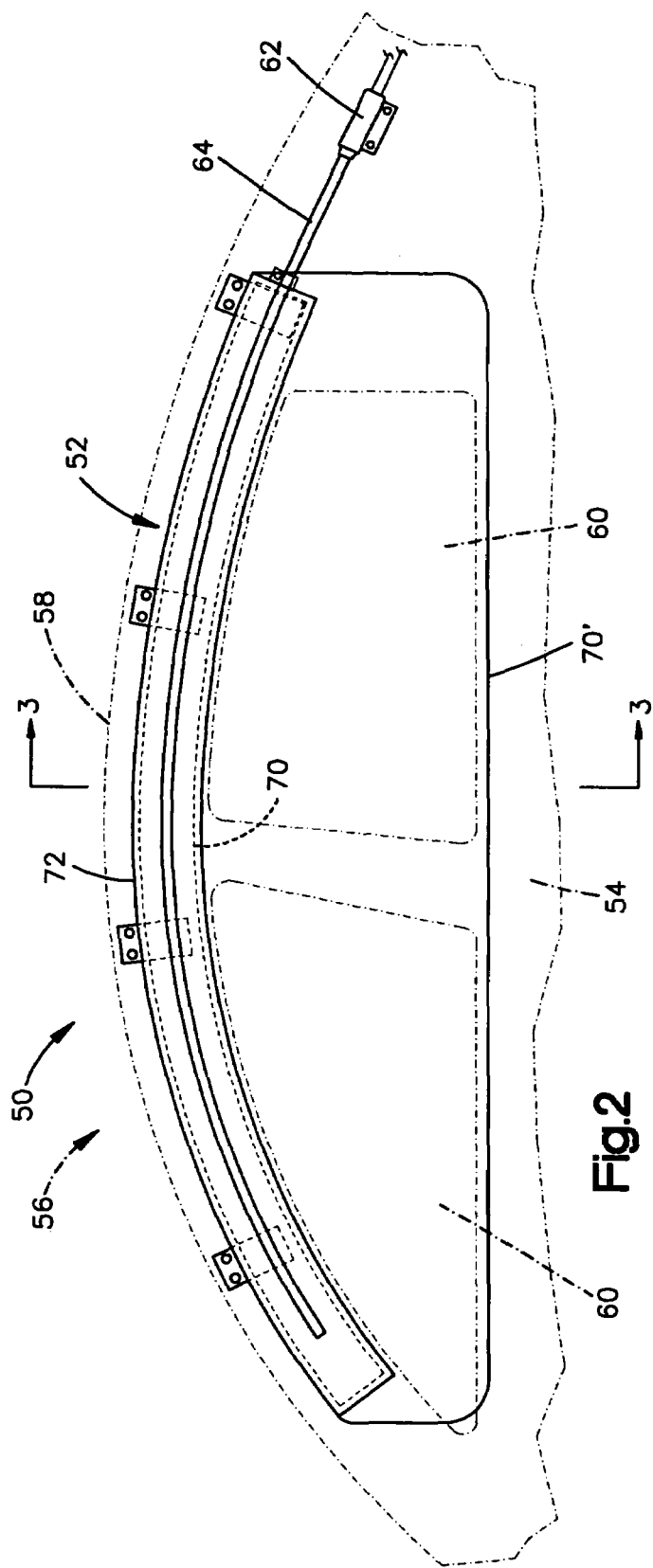
FIG. 2 is a schematic view of an apparatus for helping to protect an occupant of a vehicle illustrating stored and deployed positions of the protection device, according to the present invention.

In accordance with another aspect of the invention, the coating can be provided on a fabric substrate of an inflatable curtain of a vehicle occupant protection apparatus. FIG. 2 schematically illustrates a vehicle occupant protection apparatus 50 that includes an inflatable curtain 52. The inflatable curtain 52 of the apparatus 50 can be mounted adjacent a side structure 54 of a vehicle 56 and a roof 58 of the vehicle 56. The roof 58 can be either a standard roof that is fixed in place or a convertible roof that can be moved or removed. The side structure 54 of the vehicle 56 includes side windows 60.

An inflator 62 is connected in fluid communication with the inflatable curtain 52 through a fill tube 64. The inflator 62 can be actuatable to provide inflation fluid for inflating the inflatable curtain 52 and maintaining the curtain 52 in an inflated condition for a desired duration, such as at least two seconds, at least five seconds, or longer.

The inflatable curtain 52 is inflatable from a deflated and stored position indicated at 70 to an inflated and deployed position indicated at 70'. The apparatus 50 includes a housing 72 that stores the inflatable curtain 52 in a deflated condition. The fill tube 64, the deflated inflatable curtain 70, and housing 72 have an elongated configuration and extend along the vehicle roof 58 and along the side structure 54 of the vehicle 56 above the side windows 60. The housing 72 may have a variety of constructions.

Figure 3:
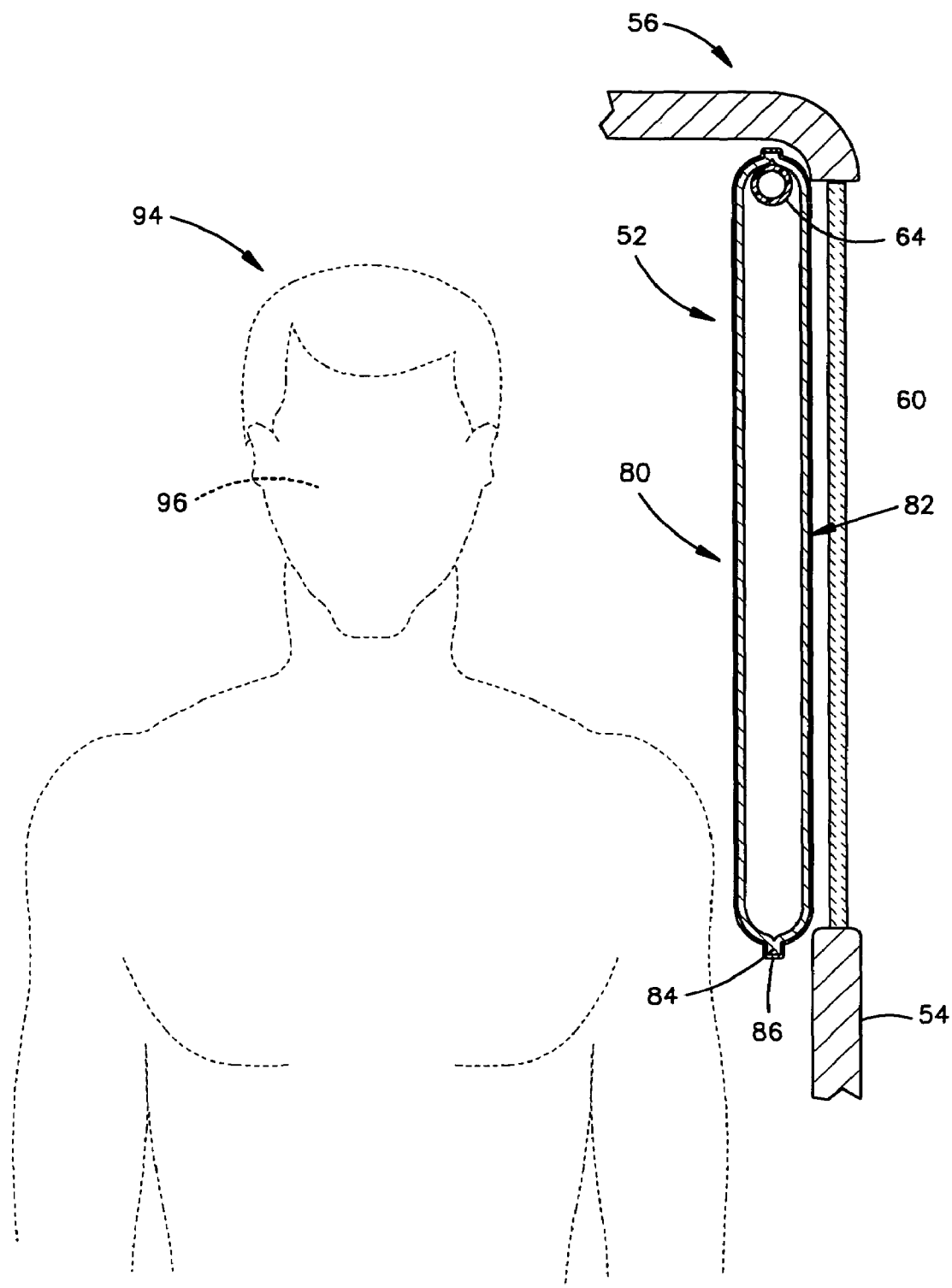
FIG. 3 is a sectional view of the apparatus taken generally along line 3-3 in FIG. 2.

Referring also to FIG. 3, the inflatable curtain 52 can comprise panels 80 and 82 that are arranged in an overlying manner. Portions of the panels 80 and 82 are secured together. For example, the panels 80 and 82 may be secured together along at least a portion of a perimeter 84 of the inflatable curtain 52 to form a perimeter connection 86 of the curtain 52. The perimeter connection 86 helps define an inflatable volume of the inflatable curtain 52. The perimeter connection 86 may be formed in a variety of manners, such as by weaving the panels 80 and 82 as a single piece of material, stitching the panels together, or interconnecting the panels by ultrasonic welding, heat bonding, or adhesives.

The inflatable curtain 14 may also include interior connections (not shown) in which the overlying panels 80 and 82 are secured together within the perimeter 84 of the curtain 52. The interior connections can form non-inflatable portions of the inflatable curtain 52 within the perimeter 84 of the curtain 52. The interior connections can also help define inflatable chambers of the inflatable curtain 52.

The panel 80 forms an inboard panel presented generally toward the occupant compartment 94 of the vehicle 56. The panel 82 forms an outboard panel that faces the vehicle side structure 54 and is positioned adjacent the side structure 54. When the inflatable curtain 52 is in the inflated and deployed position, the inboard panel 80 is positioned between the outboard panel 82 and any occupants 96 of the vehicle 56. Also, when the inflatable curtain 52 is in the inflated and deployed position, the outboard panel 82 is positioned between the inboard panel 80 and the vehicle side structure 54. The panels 80 and 82 help define inboard and outboard walls, respectively, of the inflatable volume.

During a side impact or a vehicle rollover, the outboard panel 82 of the inflatable curtain 52 may be susceptible to puncture, abrasion, or other physical damage. For example, in the event of a side impact, the outboard panel 82 may come into contact with broken glass or sheet metal from the vehicle 56 or another vehicle involved in the side impact. In the event of a rollover, the outboard panel 82 may come into contact with broken glass or sheet metal from the vehicle 56, or the roadway upon which the vehicle is traveling. Such punctures, abrasions or other physical damage to the outboard panel 82 may cause the inflatable curtain 52 to deflate, which may adversely affect the ability of the inflatable curtain 52 to help protect an occupant 96 of the vehicle 56. Also, objects that penetrate the inflatable curtain 52 could pass through the curtain and contact an occupant of the vehicle.

Figure 4:
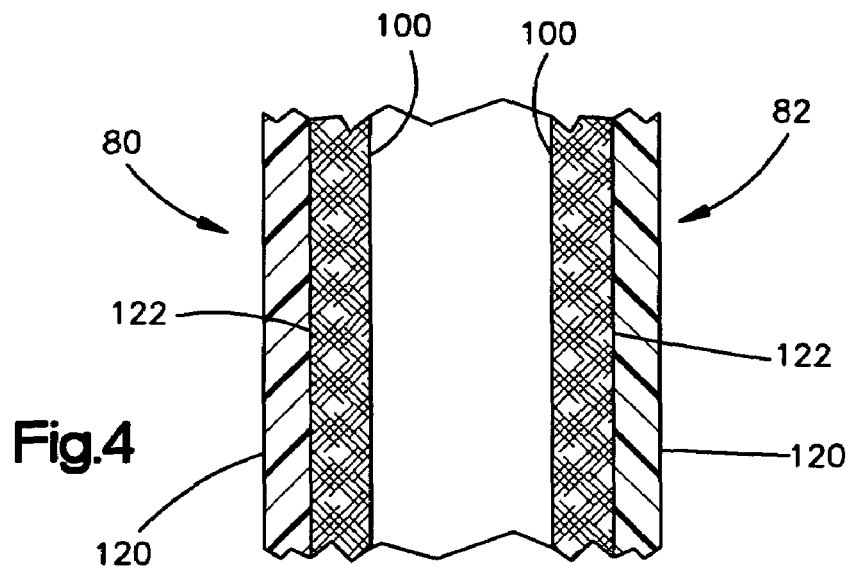
FIG. 4 is an enlarged sectional view of a portion of the apparatus of FIG. 3.

Referring to FIG. 4, the panels 80 and 82 can comprise a fabric substrate 100 that is woven from a plurality of warp yarns, or ends 102 (FIGS. 5A-5B) and a plurality of fill yarns 104 (FIGS. 5A-5B), also known as weft yarns, or picks. The warp yarns 102 and the fill yarns 104 can comprise a polyamide (e.g., nylon) or polyester material.

The warp yarns 102 and the fill yarns 104 can be oriented perpendicular to each other. The warp yarns 102 and fill yarns 104 can thus woven around each other in an alternating "up and down" fashion. Depending on the particular weave pattern, the one or more fill yarns 104 can be woven alternately over and under one or more warp yarns 102.

Figure 5A:
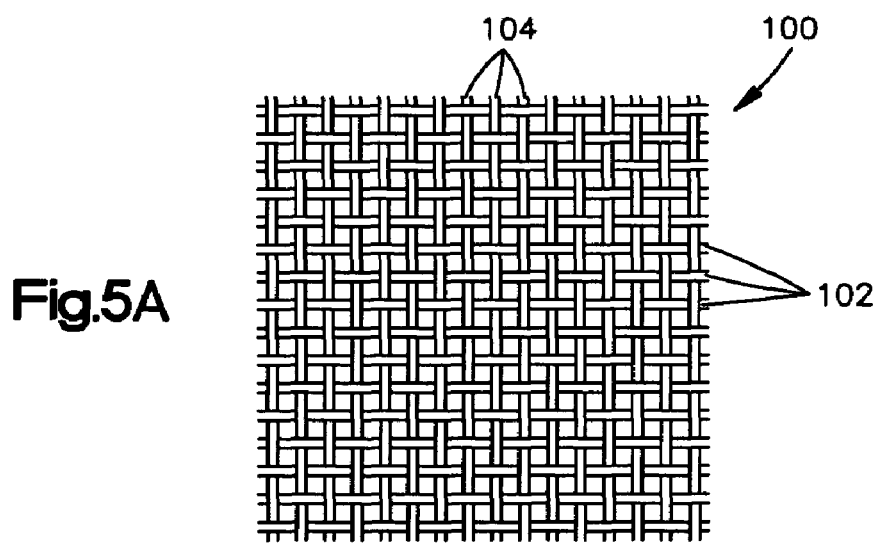
FIG. 5A is a schematic view of a portion of the apparatus of FIG. 4 in accordance with an aspect of the invention.

For example, as illustrated in FIG. 5A, the fabric substrate 100 can be woven in a one-by-one (1×1) weave pattern referred to in the art as a "plain weave" pattern. In this plain weave pattern, each warp yarn 102 is woven around each fill yarn 104 in an alternating fashion. Also, in the plain weave pattern, each fill yarn 104 is woven around each warp yarn 102 in an alternating fashion. The warp yarns 102 and fill yarns 104 are thus woven around each other at every intersection.

Figure 5B:
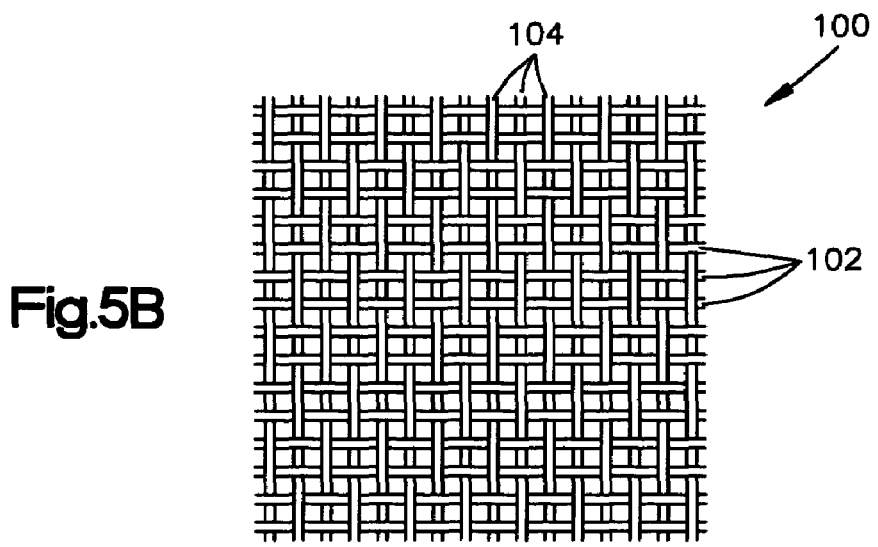
FIG. 5B is a schematic view of a portion of the apparatus of FIG. 4 in accordance with another aspect of the invention.

Alternatively, as illustrated in FIG. 5B, the fabric substrate 100 can be woven in a non-plain one-by-two (1×2) weave pattern. In the 1×2 weave pattern, two fill yarns 104 are woven around each warp yarn 102 in an alternating fashion. The warp yarns 102 in the 1×2 weave pattern are woven around the fill yarns 104 in a manner similar to that of the plain weave pattern (FIG. 5A). The warp yarns 102 are woven around the fill yarns 104 at every intersection with the warp yarns.

Optionally, the fabric substrate 100 of the inboard panel 80 and the outboard panel 82 can be woven in different weave patterns. For example, the fabric substrate 100 of the inboard panel 80 can be woven in a plain weave and the fabric substrate of the outboard panel 82 can be woven in a non-plain weave.

A coating 120 as described above in accordance with the present invention is applied to outer surfaces 122 of the fabric substrate 100 of the inboard panel 80 and the outboard panel 82 to give the inflatable curtain 52 a desired degree of gas permeability and puncture resistance. For example, the coating 120 may provide the inflatable curtain 52 with a substantially gas impermeable construction.

In an aspect of the present invention, the coating can be applied to the fabric substrate 100 of the inboard panel 80 and the outboard panel 82 using a lamination method. In the lamination method, the components of the coating composition are initially compounded into, for example, a plurality of pellets. The pellets are then formed into a tubular film having a thickness of about 25 microns to about 125 microns using a blown extrusion process. The tubular film is split and provided on a first feed roll and a second feed roll.

Figure 6:
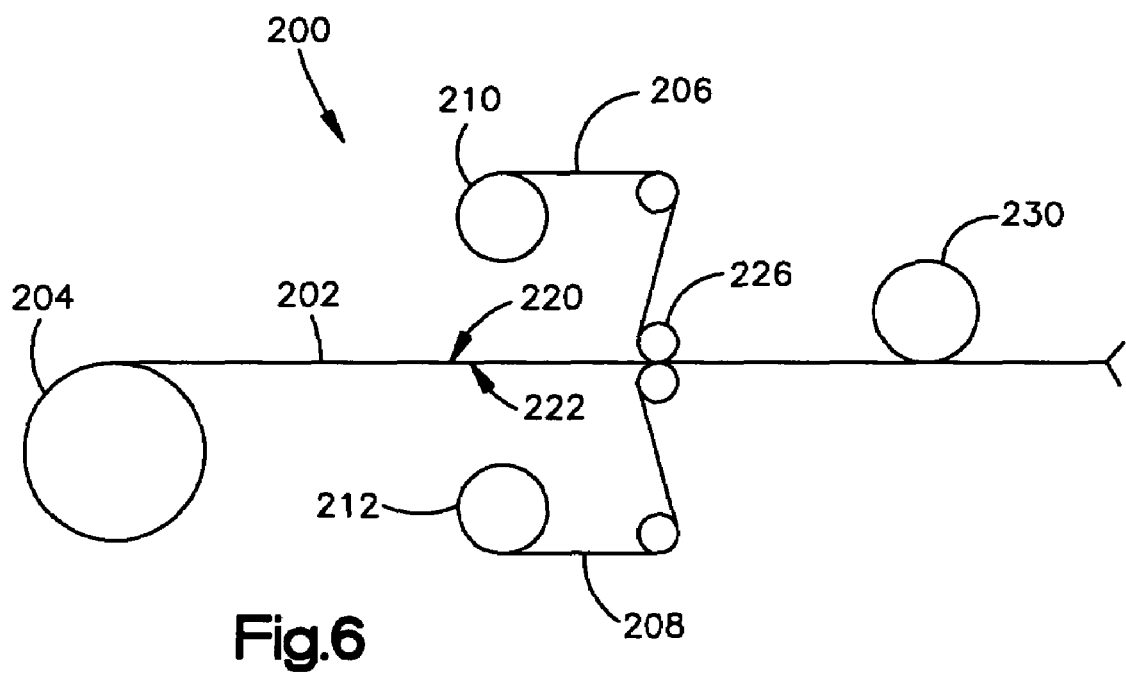
FIG. 6 is a schematic view of a lamination method of providing a coating on a fabric substrate.

FIG. 6 illustrates a method 200 of laminating a one piece woven fabric substrate 202 of an inboard panel (not shown) and outboard panel (not shown) of an inflatable curtain. The one piece woven fabric substrate is unwound from a roll 204 and laminated using films 206 and 208, which are provided from a first feed roll 210 and a second feed roll 212. The films 206 and 208 are applied to an inboard panel side 220 and an outboard panel side 222 of the one piece woven fabric substrate 202 by rollers 226. The films 206 and 208, and the fabric substrate 202 are then heated by at least one heated roller 230 to laminate the films 206 and 208 to the inboard panel side 220 and the outboard panel side 222 of the fabric substrate 202. The coated fabric substrate can then be further processed by, for example cutting the fabric substrate to the desired shape, to form an inflatable curtain.

Optionally, the coating can be applied to the fabric substrate of inboard panel 80 and the outboard panel 82 using a knife coating method (not shown). In the knife coating method, the components of the coated composition are initially compounded and then dissolved in a polar aprotic solvent, such as DMF. The solution is knife coated onto an inboard panel side and outboard panel side of the one piece woven fabric substrate. The knife coated fabric substrate is then heated by a heating means (e.g., oven) to drive off the solvent and provide a coating on the inboard panel side and the outboard panel side of the fabric substrate. The coated fabric substrate can then be further processed by, for example, cutting the fabric substrate to the desired shape to form the inflatable curtain.

From the above description of the invention, those skilled in the art will perceive improvements, changes and modifications. Such improvements, changes and modifications within the skill of the art are intended to be covered by the appended claims.

Having described the invention, the following is claimed:

1. An inflatable vehicle occupant protection device comprising:
   a fabric substrate and a coating provided on a surface of the fabric substrate, the coating including a thermoplastic polyether polyurethane base resin and an antiblocking agent, the base resin comprising at least about 60% to about 85% by weight of the coating.

2. The inflatable vehicle occupant protection device of claim 1, the coating having an outer surface, the outer surface of the coating defining the outer surface of the inflatable vehicle occupant protection device.

3. The inflatable vehicle occupant protection device of claim 1, the coating being substantially gas impermeable and having an add-on weight when applied to the fabric substrate less than about 35 g/m$^2$.

4. The inflatable vehicle occupant protection device of claim 1, the antiblocking agent comprising a blend of polyurethane and diatomaceous earth.

5. The inflatable vehicle occupant protection device of claim 1, the coating comprising about 1% to about 10% by weight of the antiblocking agent.

6. The inflatable vehicle occupant protection device of claim 1, the coating further comprising a halogen-free flame retardant.

7. The inflatable vehicle occupant protection device of claim 6, the base resin comprising a polytetramethylene glycol ether polyurethane.

8. The inflatable vehicle occupant protection device of claim 1, the coating further comprising a secondary resin, the secondary resin comprising at least one of a silicone based resin or siloxane based resin.

* * * * *